Dec. 30, 1969   L. H. J. F. BECKMANN   3,487,224
SCANNER WHICH UTILIZES A PAIR OF TIME-SHARED APERTURES
Filed Dec. 22, 1967
2 Sheets-Sheet 1

INVENTOR.
Leo Heinrich Josef Franz Beckmann
BY Arthur B Colvin
ATTORNEY

Dec. 30, 1969   L. H. J. F. BECKMANN   3,487,224
SCANNER WHICH UTILIZES A PAIR OF TIME-SHARED APERTURES
Filed Dec. 22, 1967   2 Sheets-Sheet 2

INVENTOR.
LEO HEINRICH JOSEF FRANZ BECKMANN
BY Arthur B. Colvin
ATTORNEY

United States Patent Office 3,487,224
Patented Dec. 30, 1969

3,487,224
SCANNER WHICH UTILIZES A PAIR OF TIME-SHARED APERTURES
Leo Heinrich Josef Franz Beckmann, Delft, Netherlands, assignor to N.V. Optische Industrie "De Oude Delft," Delft, Netherlands, a Dutch corporation
Filed Dec. 22, 1967, Ser. No. 692,956
Claims priority, application Netherlands, Dec. 27, 1966, 6618165
Int. Cl. H01j 39/12; G01n 21/30
U.S. Cl. 250—220
7 Claims

ABSTRACT OF THE DISCLOSURE

A line scanning device for use in an airborne vehicle in which the inclined scanning mirrors of the rotor transmit radiant energy to a collecting and focusing optics providing separate optical paths for two beams. By means of a chopper having reflecting and transmitting sectors these beams are alternately made incident on a single detector in order to double the useful scanning angle of the device.

---

The invention relates to a scanning device for use in an airborne vehicle and, more particularly, to a device which is adapted to periodically scan a narrow strip or "line" of the terrain extending transversely to the course of flight. For that purpose the device has a rotor with two or more scanning mirrors inclined at equal angles with respect to the axis of rotation of the rotor, and an optical system which collects and focuses the radiant energy from the scanning mirrors on a detector.

Devices of this class utilize the aicraft movement as the slower scanning motion so that solely the fast scanning motion (the line-scanning) must be produced by the device itself. A typical application is the so-called thermographic camera whose operation is based on the infrared rays of long wave length transmitted by the terrain and the objects thereon.

The number of scanning mirrors on the rotor is determined by the requirements imposed on the device such as the scanning angle (this is the angle through which the terrain is scanned transversely to the course of flight), the number of scans per second, the admissible number of revolutions per second of the rotor, the available bandwidth for the electric signal, the desired signal-to-noise ratio, etc.

The following formula will give some idea of the capabilities of the various rotortypes:

$$s = h - b \quad (1)$$

in which:

$s$ = the maximum scanning angle which can be suitably scanned by the device concerned;
$h = 360°/n$, in which $n$ is the number of scanning mirrors; $h$ will be referred to as the scanning repetition angle hereinafter;
$b$ = the beam angle; this is the angular width of the circle sector covered by the active beam of rays on the rotor mirrors.

Figure 5:
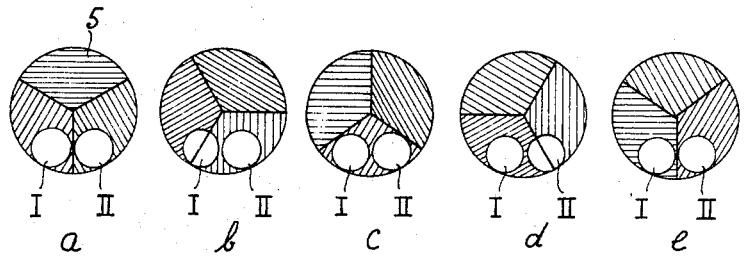
Figure 6:
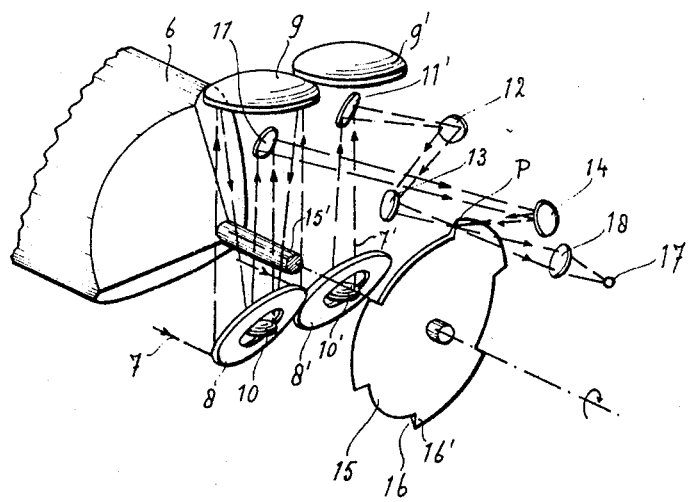

This formula will be discussed with reference to certain figures of the drawings in which:
FIGS. 1–4 show schematically some prior art configurations of the scanning rotor and the associated optical system;
FIG. 5 is a series of rotor diagrams taken at intervals of 30° serving to illustrate the features of scanning systems with two detectors; and
FIG. 6 shows schematically in perspective a preferred embodiment of the device according to the present invention.

Figure 1:
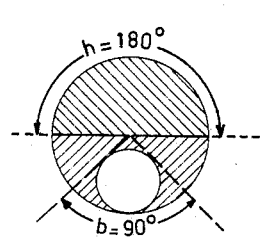
Figure 2:
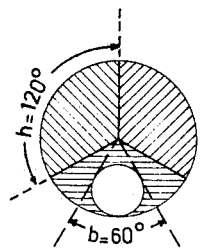
Figure 3:
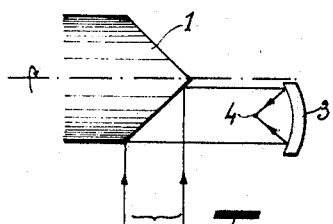

The device according to the FIGURES 1 and 3 has a rotor 1 with two scanning mirrors directing the beam of rays 2 via the concave mirror 3 to the detector 4. The device according to FIGURES 2 and 4 has a rotor 1' with three scanning mirrors. The beam of rays 2' is again focused on a detector 4' by a concave mirror 3'. According to FIG. 1 the beam, which has a circular cross-section, occupies a sector of 90° on the scanning mirrors of the rotor, seen in front elevation. Thus the beam angle $b$ in this case is 90°. The scanning repetition angle is $360°/n = 180°$. It is easy to see that in each revolution of the rotor there will be two periods, each one corresponding to a rotation through 90° of the rotor, during which mirror 3 will be receiving the complete beam of rays from one of the scanning mirrors. Thus the scanning angle $s$ through which the detector supplies a usable signal is, in agreement with the Formula 1, $180° - 90° = 90°$.

During the other half of the time the detector cannot supply a usable signal. It is possible to increase the scanning angle $s$ e.g. to 120° by reducing the beam angle $b$ to 60°. In that case, however, the cross-section of the beam, that means the amount of radiation received by the detector, is decreased.

Figure 4:
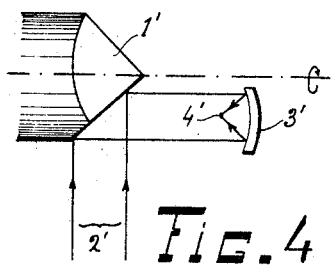

In FIGS. 2 and 4 the beam angle is in fact 60°. Owing to this it is possible to achieve a scanning angle $s$ of 60°

$$\left(s = \frac{360°}{3} - 60°\right)$$

with a rotor with three scanning mirrors. Three scans per revolution are made and this time too only half of the scanning time is effectively used.

From the foregoing it appears that with each rotor type the requirement of a beam width which is as large as possible for a given rotor diameter conflicts with the desire to increase the scanning angle and the useful scanning time. In this respect, however, the situation can be improved by the application of two detectors, each one viewing its associated part of the rotor mirrors through its own optical system.

In FIG. 5 this effect is illustrated in the case of a rotor with three mirrors and two optical systems I and II in side-by-side relation, each one covering a beam angle of 60°. The diagrams $a$–$e$ in FIG. 5 successively show five positions of the rotor 5 with respect to the optical systems I and II, each following position being taken after a clockwise rotation through 30°. In the position $a$ the detector of the optical system I has just been switched off and the detector of the optical system II which has just been switched on starts scanning the terrain via the rotor mirror. In the position $b$ the dividing line between two rotor mirrors intersects the beam of detector I. This detector remains inactive until position $c$ is reached, in which the nadir is scanned. Now the detector II is cut out and detector I takes over. Via position $d$ position $e$ is reached, in which the scanning of this line of the terrain is terminated and detector I is switched off again. At the same time the detector II is switched on to start scanning with the next rotor mirror. Thus, it turns out that after rotation of the rotor through 120° (⅓ revolution) a complete line covering 120° has been scanned, and there was no idle time.

Accordingly, it appears possible to increase the useful scanning time as well as the scanning angle by a factor 2 by the application of two detectors. By analogy of the Formula 1 this can be expressed as follows:

$$s = 2(h - b) \quad (2)$$

In the above mentioned case with $b = 60°$ and $h = 120°$, $s$ will be:

$$2(120° - 60°) = 120°$$

Various drawbacks, however, will result from the use of two detectors. It is e.g. very difficult to make two identical detectors, or even to adapt the associated circuits in such a manner, that the detectors have identical response to the same signal. This is very important because the temperature differences encountered in the scanned terrain are mostly relatively small in comparison with the absolute temperature of the terrain so that the contrasts to be expected are poor. Further, the detectors during their inactive periods still receive false radiation via the scanning mirrors, which is partly emanated from the walls etc. of the device itself. This radiation generates an error signal, which cannot be suppressed at once at the start of the next useful period. Thus, changeover phenomena are created which may be visible in the image. Other drawbacks are the more complicated electronic circuitry of the two detector device and the higher cost price.

The principal object of the invention is to provide a device having the advantages of the system with two detectors, but still operating with only one detector.

In accordance with the invention the optical system for collecting and focusing the radiant energy comprises means defining two receiving apertures for the radiant energy lying in side-by-side relation, means forming separate optical paths for focusing beams of radiant energy having entered through the two receiving apertures in respective focal points, and means for refocusing said beams on the detector after having passed through the respective focal points, said scanning device further comprising optical switching means so disposed as to interfere with said beams in the region of said respective focal points and being operable in synchronism with the rotation of the rotor so as to cause said beams of radiant energy to be alternately incident on the detector.

Thus, the invention starts from the fact that with the double-detector system each detector receives useful radiation only half of the time. By alternately directing two separate beams on one and the same detector, so that the conditions are identical for both beams, the other detector may be omitted.

It is an essential advantage of the device according to the invention that the sole detector uninterruptedly receives useful radiation. Unlike the above mentioned conventional systems with one or two detectors, the only detector in this device continuously receives radiation from the terrain to be scanned and not from internal parts of the device itself in which a different radiation level may exist than on the ground. Large error signals causing troubles in the subsequent signal processing stages will be avoided in this way.

It is observed that prior to the present invention scanning devices have already been proposed in which two beams of radiant energy are directed along separate optical paths to one and the same detector. These prior devices differ from the present invention, however, in that the scanning faces of the rotor are parallel to the axis of rotation and in that the beams do not irradiate the detector in an alternating fashion but concurrently with the aim of having a constant optical aperture owing to the additive effect of the two beams.

A preferred embodiment of the device according to the invention as shown schematically and in perspective in FIG. 6 will now be described by way of example.

Herein is 6 a rotor with a triple-mirror driven by a motor (not shown) at a constant speed. The mirror faces of this rotor scan alternately a narrow line of the terrain under the aircraft. The beam of parallel infrared rays is reflected by the triple-mirror to an optical system of which two identical plane mirrors 8 and 8' placed in side-by-side relation define the entrance apertures. These mirrors determine the beam angle as hereinbefore defined and separate from the received radiation two discrete beams 7 and 7', each one passing through a Cassegrainian mirror system consisting of a concave primary mirror 9, resp. 9' and a convex secondary mirror 10, resp. 10'. For the sake of clarity only beam 7 is shown completely and beam 7' partially. Both beams 7 and 7' are focused in a point P, forming there an image of the point of the terrain scanned at that moment. The beam 7 is focused after reflection at the mirrors 11 and 14 while beam 7' is reflected by the mirrors 11', 12 and 13, point P is positioned between the mirrors 13 and 14. An optical switch or chopper 15, which is a flat disc in the preferred embodiment, is fixedly connected with the rotor 6 through a shaft 15a and rotates in a plane through P. Along its circumference the chopper 15 is provided with reflective and transmissive areas 16' and 16' which are alternately disposed and of equal peripheral length. The number of reflecting areas is equal to the number of mirror faces on the rotor, i.e. three. After reflection at mirror 13 the beam 7' is directed to the detector 17 via one of the radiation-passing sectors 16 of the chopper 15. The position of the mirror 14 is such that the beam 7, if reflected by a reflecting sector 16' of the chopper 15, is likewise directed to the detector 17. An image of point P is formed on the detector 17 by means of a lens 18. Hence, when the chopper is rotated, the beams 7 and 7' will be alternately focused on the detector 17.

The time lapse required to switch over from one beam to the other is determined by the ratio between the circumferential speed of the chopper and the diameter of the beam where it meets the chopper. It will be clear that switching-over is completed as quickly as possible when both focal points coincide in one and the same point lying in the plane of the reflecting sectors 16'. This is the case shown in FIG. 6. However, in order to make the system less sensitive for minor irregularities in the reflecting surface it may be recommendable to admit a somewhat wider beam section by focusing the beams in different points lying symmetrically to the surface described by the reflecting areas of the chopper. Besides, when changing over from beam 7' to beam 7 the scanning device is scanning the nadir. This is not disturbing since both beams render the same information at that moment. On the other hand, the changeover from beam 7 to beam 7' at the edge of the image, involves reception of radiation from the left end of the scanned strip during the final right hand part of the scan and conversely. The useless edges of the image thus caused, may be made as narrow as desired, however, by reducing the cross-section of the beam at the place where the chopper intersects them.

What I claim is:

1. A scanning device for use in an airborne vehicle which device is adapted to periodically scan a narrow strip of the terrain extending transversely to the course of flight, comprising a rotor with at least two scanning mirrors inclined at equal angles to the axis of rotation of the rotor, and an optical system for collecting and focusing radiant energy received from the scanning mirrors on a detector, characterized in that the optical system comprises means defining two receiving apertures for the radiant energy lying in side-by-side relation, means forming separate optical paths for focusing beams of radiant energy having entered through the two receiving apertures in respective focal points, and means for refocusing said beams on the detector after having passed through the respective focal points, said scanning device further comprising optical switching means so disposed as to interfere with said beams in the region of said respective focal points and being operable in synchronism with the rotation of the rotor so as to cause said beams of radiant energy to be alternately incident on the detector.

2. The scanning device of claim 1 wherein said respective focal points are coincident in a plane in which said optical switching means is operative.

3. The scanning device of claim 1, wherein the optical switching means comprises a chopper rotatable in synchronism with the rotor and having peripheral radiation reflecting and radiation transmitting areas equal in number to the scanning mirrors on the rotor, said area being alternately disposed and of equal peripheral length.

4. The scanning device of claim 3, wherein said respective focal points lie symmetrically with respect to the surface described by the reflecting areas on the chopper while rotating, and wherein said beams of radiant energy follow the same optical path from the chopper toward the detector.

5. The scanning device of claim 3, wherein the chopper is rotatable about the same axis as the rotor and has a fixed mechanical connection therewith.

6. The scanning device of claim 1 in which the rotor has three scanning mirrors inclined at an angle of 45° to the rotor axis.

7. The scanning device of claim 1, wherein the optical system comprises two deviating mirrors placed in side-by-side relation spaced from and opposite to the scanning mirrors of the rotor, so as to receive radiant energy from said scanning mirrors and transmit the same to two mutually identical mirror objectives having parallel optical axes which extend cross-wise to the rotor axis, and a system of flat mirrors for guiding the convergent beams of radiant energy received from said mirror objectives to the respective focal points.

References Cited

UNITED STATES PATENTS 3,264,480   8/1966   Zuck et al. _____ 250—236

RALPH G. NILSON, Primary Examiner

T. N. GRIGSBY, Assistant Examiner

U.S. Cl. X.R.

178—7.6; 250—219, 236; 350—285; 356—28